United States Patent [19]

Bergmans et al.

[11] Patent Number: 5,036,524
[45] Date of Patent: Jul. 30, 1991

[54] BINARY DATA SIGNAL TRANSMISSION SYSTEM

[75] Inventors: Johannes W. M. Bergmans, Eindhoven, Netherlands; Seiichi Mita, Tokyo, Japan; Morishi Izumita, Tokyo; Nobukazu Doi, Tokyo, Japan

[73] Assignees: N.V. Philips' Gloeilampenfabrieken, Netherlands; Hitachi Ltd., Japan

[21] Appl. No.: 473,251

[22] Filed: Jan. 29, 1990

[30] Foreign Application Priority Data

Jan. 27, 1989 [JP] Japan ................................. 1-16486

[51] Int. Cl.$^5$ ............................................ H04L 25/49
[52] U.S. Cl. ........................................ 375/12; 375/18; 375/101
[58] Field of Search ................... 375/12, 14, 17, 18, 375/34, 58, 99, 101; 360/40, 42, 43; 341/155, 56, 57

[56] References Cited

U.S. PATENT DOCUMENTS

| | | | |
|---|---|---|---|
| 4,376,309 | 3/1983 | Fenderson et al. | 375/101 |
| 4,564,952 | 1/1986 | Karabanis et al. | 375/101 |
| 4,775,984 | 10/1988 | Jaffré et al. | 375/18 |
| 4,866,736 | 9/1989 | Bergmans | 375/18 |

OTHER PUBLICATIONS

"Recording Codes for Digital Magnetic Storage" by P. H. Siegel, IEEE Trans. Magn., vol. 21, No. 5, pp. 1344-1349, 1985.
"Algorithms for Sliding Block Codes", by R. L. Adler et al., IEEE Trans. Inform. Th., vol. IT-29, No. 1, pp. 5-22, 1983.
"A New Look-Ahead Code for Increased Data Density", by G. J. Jacoby, IEEE Trans. Magn., vol. MA-G-13, No. 5, pp. 1202-1204, 1977.
"Design Considerations for the D-2 Pal Composite DVTR", by R. Brush, Proc 7th Int. Conf. Video, Audio and Data Recording, York, U.K., Mar. 1988, pp. 141-148.
"Robust Data Equilization, Fractional Tap Spacing and the Zak Transform" by J. W. M. Bergmans et al., Philips Journal of Research, vol. 42, No. 4, pp. 351-398.
"Design Consideration for a 144 kbits/s Digital ..." by P. . van Gerwen et al., IEEE J. Selected Areas in Commun. vol. SAC-2, No. 2, pp. 314-323.

*Primary Examiner*—Benedict V. Safourek
*Attorney, Agent, or Firm*—Jack D. Slobod

[57] ABSTRACT

In a system for transmitting a binary source signal from a data transmitter to a data receiver through a noisy dispersive channel, the data transmitter includes a sliding block encoder which converts the binary source signal at a given symbol rate 1/T into an encoded binary data signal at a symbol rate P/(NT), where P and N are positive integers such that $N/P \leq \log(3)/2 = 0.79248$. Since the channel introduces intersymbol interference and noise into the encoded data signal, the data receiver is formed from the cascade of an equalizer, a sampler and a reconstruction circuit which serves to reconstruct the binary source signal at the symbol rate 1/T. The reconstruction circuit includes a detector in a cascade with a decoder having memory the equalizer, sampler and detector are arranged for the detection of a ternary data signal at the symbol rate P/(2NT).

4 Claims, 3 Drawing Sheets

BINARY DATA SIGNAL TRANSMISSION SYSTEM

BACKGROUND OF THE INVENTION

1. Field of the Invention

The invention relates to a system for transmitting a binary source signal from a data transmitter to a data receiver through a noisy dispersive channel introducing intersymbol interference, wherein the data transmitter has a sliding block encoder which converts the binary source signal at a given symbol rate $1/T$ into an encoded binary data signal at a symbol rate $P/(NT)$, where P and N are positive integers such that $N/P \leq ^2\log(3)/2 = 0.79248$; and the binary source signal at the symbol rate $1/T$ is reconstructed in the data receiver.

2. Description of the Related Art

Such a system is known from an article 'Recording Codes for Digital Magnetic Storage' by P. H. Siegel, IEEE Trans. Magn., Vol. MAG-21, No. 5, pp. 1344–1349, 1985, and in particular FIGS. 1 and 2 of this article. In what follows, the transformation by the sliding block encoder of the the binary source signal at the symbol rate $1/T$ into the encoded binary data signal at the symbol rate $P/(NT)$ will be referred to as a binary modulation code for the sake of brevity.

In systems of said type, the reconstruction circuit commonly consists of a memoryless detector in cascade with a decoder. The equalizer, sampler and detector are then used to reconstruct the encoded binary data signal at the symbol rate $P/(NT)$, from which the binary source signal at the symbol rate $1/T$ is recovered by means of the decoder. According to this approach, the receiver largely operates at an oversampling factor of $P/N$ with respect to the binary source signal at the symbol rate $1/T$. For typical values of $P/N$ of like 2 or 3/2, this oversampling may pose instrumentational problems when the symbol rate $1/T$ is high. To reduce such problems, it is desirable for the receiver to operate entirely without oversampling.

Such a possibility is known for the MFM modulation code, as described in said article by Siegel. For this code with $P=2$ and $N=1$, sampling may occur at the symbol rate $1/T$, and the equalizer should then be dimensioned for its sampled output signal to resemble as well as possible a linearly transformed and decimated version of the encoded data. This yields an essentially ternary signal at the symbol rate $1/T$, from which the binary source signal can be directly recovered by means of a detector without memory.

SUMMARY OF THE INVENTION

The present invention has for its object to avoid oversampling in the receiver for an enlarged category of binary modulation codes.

Thereto, the system according to the invention is characterized in that the reconstruction circuit consists of a detector in cascade with a decoder with memory, while the equalizer, sampler and detector are arranged for the detection of a ternary data signal at the symbol rate $P/(2NT)$.

A widely applicable form of said decoder with memory is characterized in that it comprises a shift register that is clocked at the symbol rate $P/(2NT)$, a buffer to store the outputs of a given number of M successive stages of said shift register during successive intervals of length $2NT$, a table addressed by the contents of said buffer whose entries are estimates of 2N successive digits of the binary source signal, and selection means to form a decoder output signal at the data rate $1/T$ from the successively addressed table entries.

A form of said decoder that is applicable for even values of P is characterized in that it comprises a shift register that is clocked at the symbol rate $P/(2NT)$, a buffer to store the outputs of a given number of M successive stages of said shift register during successive intervals of length NT, a table addressed by the contents of said buffer whose entries are estimates of N successive digits of the binary source signal, and selection means to form a decoder output signal at the data rate $1/T$ from the successively addressed table entries.

According to a second method to fulfil the object of the invention, the system is characterized in that the reconstruction circuit consists of a detector with memory, while the equalizer and sampler are arranged for the formation of an essentially ternary detector input signal at the symbol rate $1/T$.

BRIEF DESCRIPTION OF THE DRAWING

The invention will be further explained hereinbelow with reference to the drawing in which.

DETAILED DESCRIPTION OF THE PREFERRED EMBODIMENTS

In all figures, corresponding elements are denoted by the same reference symbols.

Figure 1:
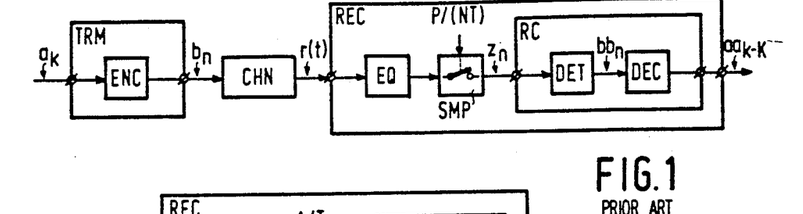
FIG. 1 shows a functional model of a data transmission system with an oversampled receiver of the above-mentioned prior art.

FIG. 1 shows a functional model of a system for transmitting a binary source signal $a_k$ at a given symbol rate $1/T$ through a noisy dispersive channel CHN to a receiver REC. The transmitter TRM comprises a sliding block encoder ENC which transforms the binary source signal $a_k$ into an encoded binary data signal $b_n$ at the symbol rate $P/(NT)$, where P and N are positive integers. Transformations of this type, herefter referred as binary modulation codes, are described, for example, in an article 'Algorithms for Sliding Block Codes' by R. L. Adler, D. Coppersmith and M. Hassner, IEEE Trans. Inform. Th., Vol. IT-29, No. 1, pp. 5–22, 1983. Apart from a delay without relevance to this exposition, said modulation codes subdivide the binary data signal $a_k$ into non-overlapping words $a_m = [a_{mN-N+1}, \ldots, a_{mN}]$ of length N, where the integer m is a word-index with m=k for N=1. Every word $a_m$ is then transformed into a word $b_m = [b_{mP-P+1}, \ldots, b_{mP}]$ of length L, the binary symbols $b_{mP-P+1}, \ldots, b_{mP}$ of which constitute P successive binary symbols of the encoded data signal $b_n$. Examples of binary modulation codes with N=1 and P=2 are the MFM, Miller-Squared and (2,7) codes as described, for example, in the aforementioned article by Siegel, which on p. 1348 also describes a code with N=2 and P=3, referred to as (1,7) code. The 3PM code, described in an article 'A New Look-Ahead Code for Increased Data Density' by G. J. Jacoby, IEEE Trans. Magn., Vol. MAG-13, no. 5, pp. 1202-1204, 1977, is an example of a binary modulation code with N=3 and P=6.

The encoded binary data signal $b_n$ is applied to a channel CHN which introduces intersymbol interference and noise into $b_n$. To simplify the forthcoming exposition, the conversion of $b_n$ into a continuous-time waveform, which generally occurs before intersymbol interference and noise are introduced, is considered to be a part of the operation of channel CHN, just as possible forms of filtering or pre-equalization that precede the receiver REC in FIG. 1. The output signal r(t) of channel CHN is applied to a receiver REC of prior art, as described, for example, in the aforementioned paper by Siegel, see in particular FIGS. 1 and 2 therein. This receiver REC comprises an equalizer EQ, a sampler SMP and a reconstruction circuit RC which consists of a memoryless threshold detector DET and a decoder DEC. The equalizer EQ operates on the received signal r(t), and its output signal is sampled at the symbol rate P/(NT) of the encoded data signal $b_n$. This yields a discrete-time signal $z_n$, which is applied to detector DET to obtain binary decisions $bb_n$ with respect to $b_n$, which are applied to decoder DEC to obtain binary decisions $aa_{k-K}$ with respect to $a_{k-K}$, where K represents the decoding delay expressed in symbol intervals T.

A disadvantage of receiver REC of FIG. 1 is that it internally operates at a rate P/(NT) which is significantly larger than that of its output signal $aa_{k-K}$ at the symbol rate 1/T for typical values of P/N like 2/1, 3/2 and 6/3, as encountered for the binary modulation codes mentioned previously. This operating speed may pose instrumentational problems when the symbol rate 1/T is high. This is the case, for example, in the D-2 standard for digital video tape recording, as described in an article 'Design Considerations for the D-2 PAL Composite DVTR' by R. Brush, Proc. $7^{th}$ Int. Conf. Video, Audio and Data Recording, York, U.K., March 1988, pp. 141-148. In this standard the aforementioned Miller-Squared code is used at a symbol rate 1/T of about 64 MB/s, so that P/(NT) has a value of approximately 128 MB/s, which is on the upper verge of current VLSI-technology.

Figure 2:
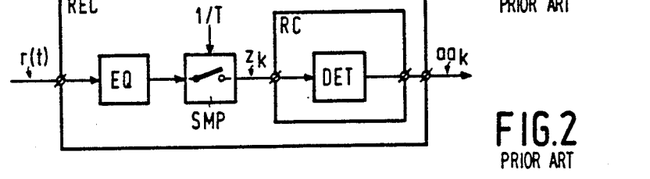
FIG. 2 shows a block diagram of a receiver for the MFM modulation code of the above-mentioned prior art.

For a system according to the prior art, a possibility to avoid oversampling in receiver REC is known for the MFM modulation code, which, as mentioned above, has P=2 and N=1. This possibility will be outlined with the help of FIG. 2, which depicts a receiver REC for the MFM modulation code that operates entirely at the symbol rate 1/T. In receiver REC of FIG. 2, the sampler SMP operates at the symbol rate 1/T of the binary source signal $a_k$, and the equalizer EQ is dimensioned for its sampled output signal $z_k$ to resemble as well as possible the ternary signal $$c_k = b_{2k} - b_{2k-1} \tag{1}$$

whose symbol rate equals 1/T. The reconstruction circuit RC contains only a memoryless detector DET, which operates on $z_k$ to take binary decisions $aa_k$ with respect to $a_k$ according to the rule:

$$aa_k = 1 \text{ if } |z_k| > 1 \text{ and } aa_k = 0 \text{ otherwise.} \tag{2}$$

This process is briefly described in the aforementioned article by Siegel, see in particular section 2 and the last part of p. 1346. In expression (2) and in what follows $a_k$ and $aa_k$ are assumed to be in the alphabet $\{0,1\}$. Furthermore, $b_n$ and $bb_n$ are taken to be in the alphabet $\{-1,+1\}$, so that the possible values for $c_k$ and $cc_k$ are $-2$, $0$ and $+2$. These assumptions are not meant to be restrictive, but are only made to simplify the exposition.

The fact that oversampling in receiver REC in FIG. 2 can be avoided is due to the simple structure of the MFM code, as discussed in the aforementioned article by Siegel. For more complicated binary modulation codes, the receiver structure of FIG. 2 is, however, not applicable. This would seem to necessitate oversampling. The invention shows that this is often not the case.

Figure 3:
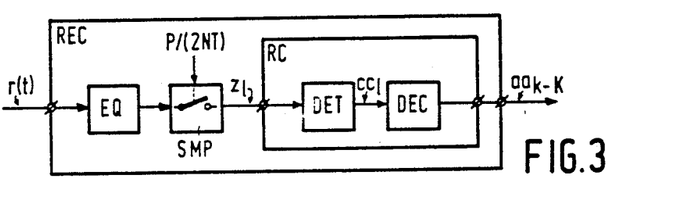
FIG. 3 shows a block diagram of a receiver according to the invention with a reconstruction circuit consisting of a detector and a decoder with memory.

In a first embodiment of a system according to the invention, the reconstruction circuit RC differs from the one of FIG. 2 in that the memoryless detector DET takes ternary rather than binary decisions and is followed by a decoder DEC with memory. The consequences of this modification will be explained with the help of FIG. 3. In the receiver REC of FIG. 3, the sampler SMP operates at the symbol rate P/(2NT), twice lower than the value P/(NT) of receiver REC in FIG. 1. The equalizer EQ is dimensioned for its sampled output signal $z_l$ to resemble as well as possible the signal $$c_l = (b * g)_{2l} \tag{3}$$

of symbol rate P/(2NT). In the important practical case that P/N=2, the signal $c_l$ has symbol rate 1/T, and the index l in expression (3) and forthcoming expressions can be equated with the index k in FIG. 1 and expressions (1) and (2). In expression (3), the symbol '*' denotes linear discrete-time convolution, and $g_n$ is a given impulse response which is usually specified in terms of its partial-response polynomial g(D), defined as:

$$g(D) = \sum_{n=-\infty}^{\infty} g_n D^n. \tag{4}$$

Details about these partial-response polynomials and the related partial-response techniques are to be found, for example, in the article 'Partial-Response Signaling' by P. Kabal and S. Pasupathy, IEEE Trans. Commun., Vol. COM-23, No. 9, pp. 921-934, September 1975. According to the invention, the signal $c_l$ is to be ternary. Apart from a delay and a scaling factor without relevance to the invention, this requires g(D) to have the form $$g(D) = 1 \pm D^L \tag{5}$$

for some positive integer L. Typical choices for L are L=1 and L=3, but other choices are not excluded. By combining the expressions (3),(4) and (5), it follows that the signal $c_l$ can be denoted as:

$$c_l = b_{2l} \pm b_{2l-L}, \quad (6)$$

which is a generalized form of expression (1). Techniques to dimension the equalizer EQ in such a way that its sampled output signal $z_l$ resembles the signal $c_l$ as well as possible are not described here as they are well documented in the literature for several equalizer types, see e.g. an article 'Robust Data Equalization, Fractional Tap Spacing and the Zak Transform' by J. W. M. Bergmans and A. J. E. M. Janssen, Philips Journal of Research, Vol. 42, No. 4, pp. 351-398, 1987, which discusses this issue for the linear equalizer. A similar discussion can be found for the decision-feedback equalizer in an article 'Partial-Response Equalization' by J. W. M. Bergmans, Philips Journal of Research, Vol. 42, No. 2, pp. 209-245, 1987. The signals $c_l$ of expression (6) are not the only partial-response signals of interest to the invention. Also of interest is a second category of partial-response signals:

$$d_l = b_{2l-1} \pm b_{2l-L-1}, \quad (7)$$

which is obtained from the signals $c_l$ by means of a shift over a time interval $NT/P$. The corresponding partial-response polynomials $g(D)$ are of the form $$g(D) = D \pm D^{L+1}. \quad (8)$$

For an equalizer that has been dimensioned for its sampled output signal $z_l$ to approximate $c_l$ closely, it suffices to advance the sampling phase of sampler SMP by an interval $(NT/P)$ in order for $z_l$ to resemble $d_l$. Although for reasons of simplicity the forthcoming exposition is entirely cast in terms of the signals $c_l$ in expression (6), it will be clear that it is equally applicable to the signals $d_l$ as defined in expression (7).

In the receiver REC of FIG. 3, the sampled output signal $z_l$ of equalizer EQ is applied to a detector DET which takes ternary decisions $cc_l$ with respect to $c_l$. These decisions $cc_l$ are applied to a decoder DEC to obtain binary decisions $aa_{k-K}$ with respect to $a_{k-K}$, where K represents the decoding delay in symbol intervals T. According to the invention, this decoder DEC should have memory, i.e. it should base its decisions $aa_{k-K}$ on the current and M most recent symbols $cc_l, \ldots, cc_{l-M}$ for some positive memory length M.

Figure 4:
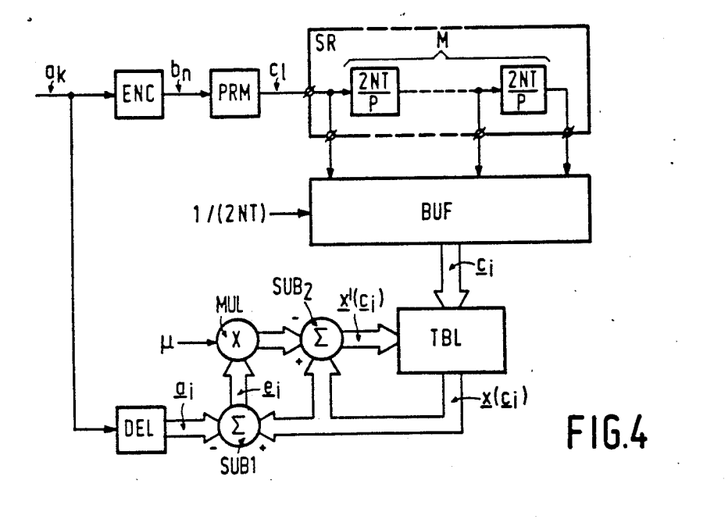
FIG. 4 shows a block diagram of a system for the identification of decoding rules.

Before explaining this decoding process in more detail, it should be mentioned that even in the absence of decision errors perfect reconstruction of $a_{k-K}$ may be intrinsically impossible. For example, if an even value for L is selected, then the signal $c_l$ of expression (6) contains only information about half of the encoded data symbols, viz. the symbols $b_n$ with even indices n. This information is generally insufficient to be able to reconstruct the binary source signal $a_k$. Even for odd L perfect decoding is not always possible. More in particular, as $c_l$ and $d_l$ are both ternary signals at the symbol rate $P/(2NT)$, they can support an information content of up to $^2\log(3)$ bits per time-unit $2NT/P$. Per symbol interval T this amounts to $^2\log(3)*P/(2N)$ bits, and only when this quantity exceeds the maximum information content of the binary source signal $a_k$, viz. 1 bit per symbol interval T, may enough information be preserved in the transformations of expressions (6) and (7) to enable perfect decoding. This argument shows that the receiver structure of FIG. 3 is unpractical for $N/P > {}^2\log(3)/2 = 0.79248$, a range which is excluded in the invention. It can be noted that the typical values for $N/P$ of ½, 2/3 and 3/6 of the binary modulation codes mentioned earlier are all smaller than $^2\log(3)/2$. At least in principle, the receiver structure of FIG. 3 is therefore applicable to them. At a first glance, it may seem to be a difficult task to identify partial response-polynomials $g(D)$ for which perfect decoding is possible and the corresponding decoding rule of decoder DEC in FIG. 3. FIG. 4 serves to show that this task is in reality straightforward.

In the system of FIG. 4, an encoder ENC uses a given binary modulation code with rate $N/P \leq {}^2\log(3)/2$ to transform a random binary source signal $a_k$ at the symbol rate $1/T$ into an encoded binary data signal $b_n$ at the symbol rate $P/(NT)$. A circuit PRM uses a given partial-response mapping of the type (6) to transform said signal $b_n$ into a signal $c_l$ at the symbol rate $P/(2NT)$. This signal $c_l$ is applied to a serial shift register SR with M stages of unit delay $2NT/P$ that is clocked at the symbol rate $P/(2NT)$, so that exactly P new symbols of signal $c_l$ enter shift register SR every 2N symbol intervals T. Once in every such period of 2N symbol intervals T the outputs of the successive stages of shift register SR are latched into a $(M+1)$-bit wide buffer BUF to obtain a buffer output vector:

$$c_i = [c_{iP-M}, \ldots, c_{iP}] \quad (9)$$

which serves as an address for a table TBL. In expression (9), an increment of the integer index i by 1 corresponds to a time-increment of 2N symbol intervals T. For each of the $3^{M+1}$ possible addresses $c_i$, said table TBL stores a vector $x(c_i)$. The 2N components $x_{-2N+1}(c_i), \ldots, x_0(c_i)$ of this vector $x(c_i)$ are desired to equal the binary source symbols $a_{2iN-2N+1-K}, \ldots, a_{2iN-K}$, respectively, that are to be reconstructed during the given interval of 2N symbol intervals T. This is of course only possible when a decoder exists for the given modulation code and a partial-response polynomial in conjunction with the selected decoding delay K and decoder memory length M.

To determine if such a decoder exists, a vector $a_i$ with components $a_{2iN-K-N+1}, \ldots, a_{2iN-K}$ is formed by a delay circuit DEL and subtracted componentwise from $x(c_i)$ by means of a subtractor SUB1 to obtain an error vector:

$$e_i = x(c_i) - a_i. \quad (10)$$

This error vector $e_i$ is multiplied componentwise by a scalar step size $\mu$ in a multiplyer MUL and subtracted componentwise from $x(c_i)$ by a subtractor SUB2 to obtain a new and ideally improved table entry:

$$x'(c_i) = x(c_i) - \mu * e_i, \quad (11)$$

which is stored in the table TBL instead of $x(c_i)$. The adaptation algorithm specified by expressions (10) and (11) is generally known as the LMS algorithm. Its properties are not described here as they are well documented in the literature, see e.g. an article 'Design Considerations for a 144 kbit/s Digital Transmission Unit for the Local Telephone Network' by P. J. van Gerwen, N. A. M. Verhoeckx and T. A. C. M. Claasen, IEEE J. Selected Areas in Commun., Vol. SAC-2, No. 2, pp. 314-323. This article discusses application of the LMS algorithm to adaptive table look-up filters, and is as such closely related to the decoder identification method that is presently being discussed. In conventional applications of the LMS algorithm, additive observation noise precludes the use of a large step size $\mu$. The system of FIG. 4, however, can be easily implemented numerically without noise, provided that roundoff-errors are negligible. This permits $\mu$ to be as large as 1, a choice which results in one- step convergence when the components of the table entries are all initialized at 0.5, halfway the two possible data levels $a_k=0$ and $a_k=1$. By virtue of the redundancy introduced by the modulation code, it is possible that some of the addresses $c_i$ can never occur. Table entries for such impossible addresses are never updated, and its components still have the initial value 0.5 upon completion of the identification process, unlike the components of the remaining entries which are either 0 or 1.

After initialization of table TBL, the adaptation of (10) and (11) is carried out during many periods of length 2NT, typically between 10,000 and 1000,000, until a steady state is reached in which the components of the error vector $e_i$ no longer decline in power. This power can be measured, for example, as the sum of squares of the 100 most recent values of a component, or in another convenient manner. When one or more of the steady-state powers significantly exceeds zero, perfect decoding is impossible for the applied modulation code and partial-response polynomial in conjunction with the selected values of M and K. Conversely, when all powers are essentially equal to zero, perfect decoding is possible, and the contents of table TBL specify the decoding rule.

In the important practical case with N=1 and P=2, the symbol rate P/(2NT) of the ternary signal $c_l$ in FIG. 4 is simply equal to the symbol rate 1/T, so that the integer number of exactly one symbol $c_k$ enters shift register SR during every symbol interval T. This allows latching to occur twice faster than indicated above, viz. once every symbol interval T. Furthermore, since only one symbol $a_{k-K}$ is to be reconstructed during this interval, the vectors $x(c_i)$, $a_i$ and $e_i$ defined above degenerate in this case into scalars $x(c_{k-M}, \ldots ,c_k)$, $a_{k-K}$ and $e_k$, respectively. These simplifications render decoder identification especially simple for N=1 and P=2. Similar simplifications are possible for any even value of P, as in this case an integer number of symbols $c_l$ already enters shift register SR in a period as small as N (as opposed to 2N) symbol intervals T. This again enables latching to occur twice faster than indicated above, so that the number of components of the vectors defined previously can be reduced by a factor of 2.

By repeating the identification procedure for all allowable or realistic choices for g(D), M and K it is straightforward to find the applicable partial-response polynomials for a given binary modulation code as well as the corresponding decoding rules. For various binary modulation codes of practical interest, including the Miller-Squared, (2,7), (1,7) and 3PM codes mentioned earlier, this procedure shows that perfect decoding is only possible for a strictly positive decoding delay M. This clarifies why the invention requires decoder DEC to have memory.

Figure 5:
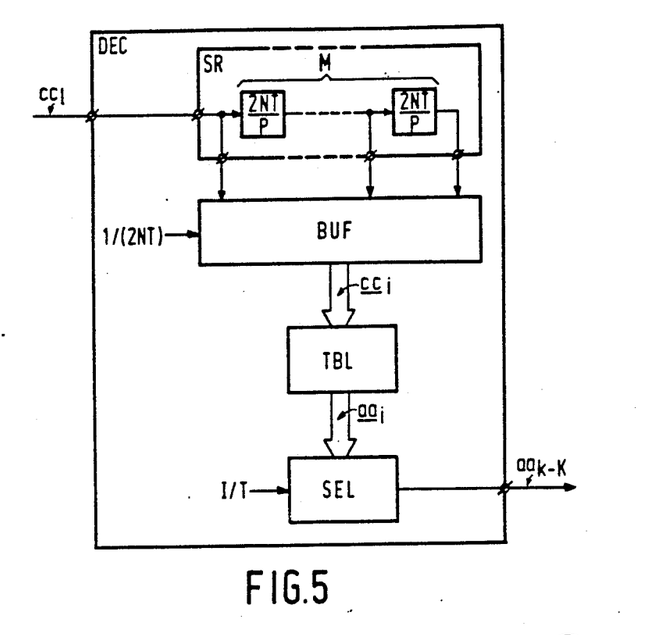
FIG. 5 shows a block diagram of a decoder according to the invention.

FIG. 5 shows how a decoder DEC can be constructed with the aid of a table TBL as identified with the procedure just described. In this block diagram, ternary decisions $cc_l$ with respect to $c_l$ are applied to a shift register SR with M stages that is clocked at the symbol rate P/(2NT), so that exactly P new symbols of signal $cc_l$ enter shift register SR every 2N symbol intervals T. Once in every such period of 2N symbol intervals T the outputs of the successive stages of shift register SR are latched into a (M+1)-bit wide buffer to obtain a buffer output vector:

$$cc_i = [cc_{iP-M}, \ldots, cc_{iP}] \quad (12)$$

which serves as an address for table TBL. In expression (12), an increment of the integer index i by 1 corresponds to a time- increment of 2N symbol intervals T. The vector $aa_i$ with components $aa_{2iN-2N+1-K}, \ldots ,aa_{2iN-K}$ that is read from the table at the location specified by address $cc_i$ is applied to a selection circuit SEL. At successive instants k, this circuit selects successive components of $aa_i$ to form the output signal $aa_{k-K}$ at the symbol rate 1/T.

As explained earlier, for any even value of P the decoder DEC of FIG. 5 can be simplified by latching the outputs of shift register SR once every N rather than 2N symbol intervals T into buffer BUF, thereby enabling the number of components of vector $aa_i$ to be halved. Furthermore, for P=2 and N=1 the vector $aa_i$ degenerates into a scalar $a_{k-K}$, so that selection circuit SEL can be omitted.

Although the decoder of FIG. 5 can be generally applied in systems according to the invention, it is often possible to specify the decoding action in terms of logic operations on the signals $c_{l-M}, \ldots ,c_l$. This possibility, which may lead to a simpler implementation of decoder DEC, will be illustrated later.

Figure 6:
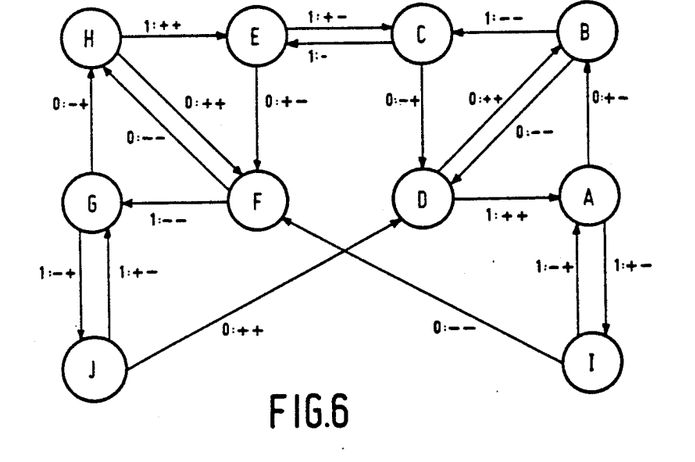
FIG. 6 shows the state diagram of the Miller-Squared code.

To exemplify the foregoing exposition, the receiver of FIG. 3 will now be developed in more detail for the Miller-Squared modulation code, for which P=2 and N=1, in conjunction with the partial-response polynomial g(D)=1+D. To this end, FIG. 6 depicts the state diagram of the Miller-Squared code, as presented in the aforementioned article by Wood. The diagram contains 10 states $S_k$, labeled A, B, ..., I. At any instant k, the current state $S_k$ is changed into a new state $S_{k+1}$ under the control of the symbol $a_k$. At the same time two encoded binary digits $b_{2k-1}$ and $b_{2k}$ are produced. Possible transitions between states are indicated in FIG. 6 by means of arrows. The annotation along the arrows is of the form $a_k$: $b_{2k-1}b_{2k}$, with '+' and '−', denoting +1 and −1, respectively.

For the partial-response polynomial g(D)=1+D, the signal $c_k$ of expressions (3) and (6) becomes:

$$c_k = b_{2k} + b_{2k-1}. \quad (13)$$

In this expression, indices k rather than l are used to indicate that $c_l$ has a symbol rate 1/T equal to that of the binary source signal $a_k$. Application of the decoder identification procedure just described to the Miller-Squared code in conjunction with the partial-response polynomial g(D)=1+D shows that decoding is possible for a decoder DEC with memory length M=1 and a decoding delay K=2. The corresponding decoding table TBL has $2^{K+1}=9$ entries, whose values upon completion of the identification process are shown in table 1.

TABLE 1

Decoding table TBL for system with Miller-Squared modulation code and partial-response polynomial g(D) = 1 + D

| $c_{k-1}$ | $c_k$ | $a_{k-2}$ |
|---|---|---|
| −2 | −2 | 1 |
| −2 | 0 | 0 |
| −2 | +2 | 0 |

TABLE 1-continued

Decoding table TBL for system with
Miller-Squared modulation code and
partial-response polynomial
$g(D) = 1 + D$

| $c_{k-1}$ | $c_k$ | $a_{k-2}$ |
|---|---|---|
| 0 | −2 | 1 |
| 0 | 0 | 1 |
| 0 | +2 | 1 |
| +2 | −2 | 0 |
| +2 | 0 | 0 |
| +2 | +2 | 1 |

Table 1. Decoding table TBL for system with Miller-Squared modulation code and partial-response polynomial $g(D)=1+D$.

To demonstrate the correctness of this decoding table, table 2 summarizes all possible transitions between three consecutive states $S_{k-1}$, $S_k$ and $S_{k+1}$, together with the associated values of $a_{k-2}$, $c_{k-1}$ and $c_k$. With the aid of expression (13) it is straightforward to compile table 2 from the state diagram of FIG. 6.

TABLE 2

Possible values of $a_{k-1}$, $c_{k-1}$ and $c_k$ for
all allowable transitions $S_{k-1} \rightarrow S_k \rightarrow S_{k+1}$.

| $S_{k-1}$ | $S_k$ | $S_{k+1}$ | $a_{k-2}$ | $c_{k-1}$ | $c_k$ |
|---|---|---|---|---|---|
| A | B | C,D | 1 | 0 | −2 |
| A | I | A | 1 | 0 | 0 |
| A | I | F | 1 | 0 | −2 |
| B | C | D,E | 0 | −2 | 0 |
| B | D | A,B | 0 | −2 | +2 |
| C | D | A,B | 1 | 0 | +2 |
| C | E | C,F | 1 | 0 | 0 |
| D | A | B,I | 0 | +2 | 0 |
| D | B | C,D | 0 | +2 | −2 |
| E | C | D,E | 1 | 0 | 0 |
| E | F | G,H | 1 | 0 | −2 |
| F | G | H,J | 0 | −2 | 0 |
| F | H | E,F | 0 | −2 | +2 |
| G | H | E,F | 1 | 0 | +2 |
| G | J | G | 1 | 0 | 0 |
| G | J | D | 1 | 0 | +2 |
| H | E | C,F | 0 | +2 | 0 |
| H | F | G,H | 0 | +2 | −2 |
| I | F | G,H | 1 | −2 | −2 |
| J | D | A,B | 1 | +2 | +2 |

Table 1 is evidently compatible with the last 3 columns of table 2. This demonstrates the correctness of table 1. According to both tables, $a_{k-2}=1$ whenever $c_{k-1}=0$. Furthermore, $a_{k-2}=1$ whenever $c_{k-1}=c_k$. This covers all possibilities for which $a_{k-2}=1$, i.e. in all other cases $a_{k-2}=0$. Hence $a_{k-2}$ can be recovered from $c_k$ by means of decoder with a memory length $M=1$ and a decoding delay $K=2$ according to the decoding rule:

IF $c_{k-1}=0$ OR $c_{k-1}=c_k$ THEN $a_{k-2}=1$ ELSE
$a_{k-2}=0$.  (14)

Figure 7:
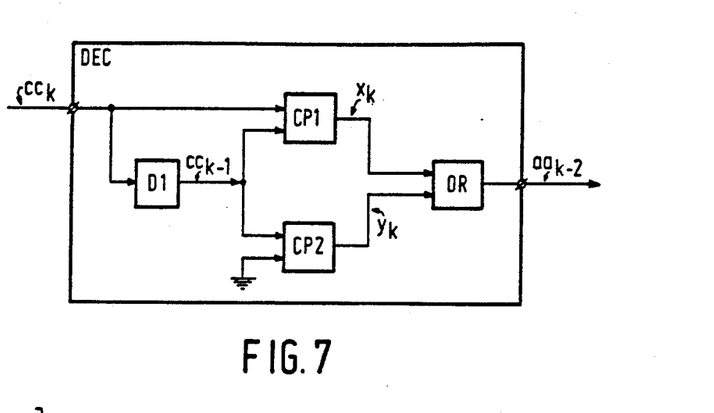
FIG. 7 shows a circuit diagram of a decoder for the Miller-Squared code according to the invention.

An embodiment of a decoder DEC according to decoding rule (14) is shown in FIG. 7. The ternary input signal $cc_k$ at the symbol rate $1/T$ of decoder DEC is applied to a delay element D1 that introduces a delay of one symbol interval T. The output signal $cc_{k-1}$ of said delay element D1 is compared with $cc_k$ in a comparator CP1, whose binary output signal $x_k$ equals 1 when $cc_k$ and $cc_{k-1}$ are equal and 0 otherwise. A second comparator CP2 compares $cc_{k-1}$ with the fixed value 0. The resulting signal $y_k$ is 1 when $cc_{k-1}$ equals 0 and 0 otherwise. A logical 'OR'-gate OR operating on $x_k$ and $y_k$ finally produces decisions $aa_{k-2}$ with respect to the binary source signal $a_{k-2}$.

For the sake of completeness it is mentioned here that two additional decoders DEC for the Miller-Squared code exist. The first one pertains to the partial-response polynomial $g(D)=D+D^2$ (i.e. to a partial-response signal $d_k=b_{2k-1}+b_{2k-2}$ within the category of expression (7)), and has decoding rule:

IF $d_{k-2}=0$ OR $d_{k-1}=0$ OR $d_{k-2}=d_{k-1}=d_k$
THEN $a_{k-2}=0$ ELSE $a_{k-2}=1$.  (15)

This rule has a decoding delay K of 2 symbol intervals T, and a memory length M of 2 symbol intervals T. The second decoder DEC pertains to the partial-response polynomial $g(D)=1-D^3$ (i.e. to a partial-response signal $c_k=b_{2k}-b_{2k-3}$ within the category of expression (6)), and has decoding rule:

IF $c_{k-1}=c_k$ OR $(c_{k-1}=0$ AND $(c_{k-2}=0$ OR
$c_k=c_{k-3}))$ OR $c_k=0$ THEN $a_{k-2}=1$ ELSE
$a_{k-2}=0$,  (16)

for which $K=2$ and $M=3$. Both decoders are easily implemented with a circuit similar to that of decoder DEC in FIG. 7.

As a second illustration of the foregoing exposition, possibilities for reception according to FIGS. 3 and 5 will now be elaborated in some detail for the 3PM modulation code. This code, described in the aforementioned paper by Jacoby, has $P=6$ and $N=3$, so that the symbol rate $P/(2NT)$ of the signal $c_l$ in FIG. 3 amounts again to $1/T$. By applying the decoder identification procedure described earlier, decoders DEC are found to exist for the partial response-polynomials $g(D)=1+D$, $D+D^2$, $1-D^3$ and $D-D^4$. This gives a total of 4 possibilities to avoid oversampling in the receiver REC of FIG. 3. By way of example, table 3 presents the decoding table TBL for the partial-response polynomial $g(D)=D-D^4$, which pertains to a partial-response signal $d_k=b_{2k-1}-b_{2k-4}$ within the category of expression (7).

TABLE 3

$D - D^4$ decoding table for 3PM code.

| $(d_{3i-2}, D_{3i-1}, d_{3i})$ | $a_{3i-3}$ | $a_{3i-2}$ | $a_{3i-1}$ |
|---|---|---|---|
| ( 0, 0,−2), ( 0, 0,+2) | 0 | 0 | 0 |
| ( 0,−2,−2), ( 0,+2,+2) | 0 | 0 | 1 |
| (−2,−2, 0), (+2,+2, 0) | 0 | 1 | 0 |
| (−2,−2,+2), (+2,+2,−2) | 0 | 1 | 1 |
| ( 0,−2, 0), ( 0,+2, 0) | 1 | 0 | 0 |
| (−2, 0, 0), (+2, 0 , 0) | 1 | 0 | 1 |
| (−2, 0,+2), (+2, 0 ,−2) | 1 | 1 | 0 |
| (−2,+2,+2), (+2,−2 ,−2) | 1 | 1 | 1 |

Table 3. $D-D^4$ decoding table for 3PM code. According to table 3, only 3 ternary symbols $d_{3i-2}$, $d_{3i-1}$ and $d_{3i}$ are at any moment involved in the decoding process. This compares favourably with the 7 binary digits that are involved in this process in the oversampled receiver for 3PM according to the prior art, as described in some detail in said article by Jacoby. For the sake of compactness the correctness of table 3 is not demonstrated here, nor are the decoding tables presented for the partial-response polynomials $g(D)=D+D^2$, $g(D)=1-D^3$ and $g(D)=D-D^3$. As explained earlier, a decoder DEC for 3PM is readily implemented on the basis of the decoding table of table 3 and the circuit of FIG. 5.

For the modulation codes mentioned above and described in said articles by Siegel and Jacoby, table 4 summarizes as a further example partial-response polynomials g(D) for which perfect decoding is possible, together with the memory length M and decoding delay K of the required decoder DEC.

TABLE 4

Applicable partial-response polynomials for various modulation codes mentioned above.

| Code | N | P | g(D) | M | K |
|---|---|---|---|---|---|
| MFM | 1 | 2 | $D + D^2$ | 1 | 1 |
|  |  |  | $1 - D^3$ | 1 | 1 |
| Miller-Squared | 1 | 2 | $1 + D$ | 1 | 2 |
|  |  |  | $D + D^2$ | 2 | 2 |
|  |  |  | $1 - D^3$ | 3 | 2 |
| (2,7) | 1 | 2 | $1 + D$ | 4 | 3 |
|  |  |  | $D + D^2$ | 4 | 4 |
|  |  |  | $D - D^3$ | 5 | 4 |
|  |  |  | $D - D^4$ | 4 | 5 |
| (1,7) | 2 | 3 | $1 + D$ | 5 | 5 |
|  |  |  | $D + D^2$ | 6 | 5 |
| 3PM | 3 | 6 | $1 + D$ | 3 | 3 |
|  |  |  | $D + D^2$ | 4 | 4 |
|  |  |  | $1 - D^3$ | 2 | 3 |
|  |  |  | $D - D^4$ | 5 | 5 |

For the sake of compactness the decoding tables are not reproduced here, nor is their validity demonstrated.

Figure 8:
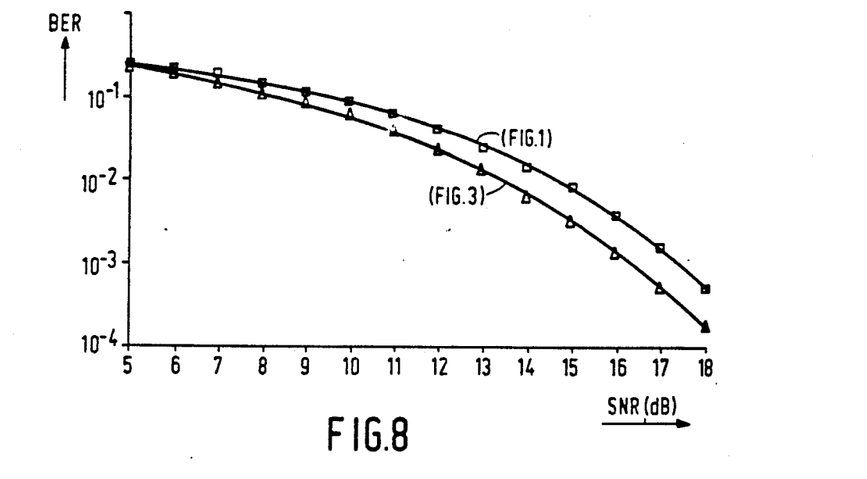
FIG. 8 shows bit error characteristics of the receivers of FIGS. 1 and 3 for a system that uses the Miller-Squared code.

As a final example with respect to the receiver structure of FIG. 3, FIG. 8 depicts bit error characteristics that were obtained by simulation for a system with the Miller-Squared modulation code described earlier and a channel CHN that is characteristic for digital magnetic recording at the comparatively high normalized information density of 2, as described in said article by Bergmans. The curve with rectangles in FIG. 8 pertains to the receiver REC of prior art according to FIG. 1, whereas the curve with triangles pertains to a receiver REC according to the invention as shown in FIG. 3. The latter receiver REC is based on the partial-response polynomial $g(D)=1+D$ and uses the decoder DEC of FIG. 7. Its performance is clearly superior to that of the receiver of prior art. Thus, in addition to fulfilling the aforementioned object of the invention, the receiver of FIG. 3 may also be attractive in terms of its performance.

Figure 9:
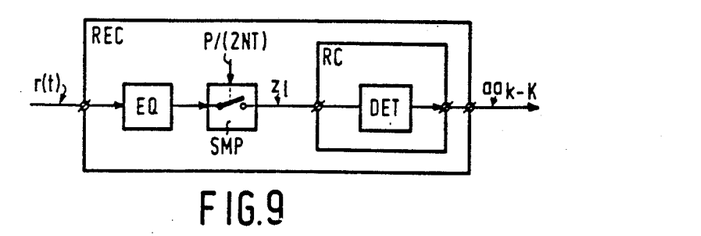
FIG. 9 shows a block diagram of a receiver according to the invention with a reconstruction circuit consisting of a detector with memory.

FIG. 9 shows a second block diagram of a receiver according to the invention. In the receiver REC of FIG. 9, the reconstruction circuit RC contains a detector DET with memory that forms estimates $aa_{k-K}$ of the binary source signal $a_k$, where K represents the detection delay expressed in symbol intervals T. Just as in FIG. 3, the sampler SMP operates at the symbol rate P/(2NT), and the equalizer EQ is dimensioned for its sampled output signal to resemble as well as possible one of the signals $c_l$ in the category of expression (7). As before, it is of course necessary to choose a signal $c_l$ from which perfect reconstruction of $a_{k-K}$ is at least in principle possible. Suitable partial-response polynomials g(D) can be determined, for example, with the aid of the decoder identification procedure described previously, and are presented in table 4 for some binary modulation codes of practical interest. In the absence of additive disturbances like noise and residual intersymbol interference, the sampled output signal $z_l$ of equalizer EQ simply equals the selected signal $c_l$. Furthermore, this signal $c_l$ depends in a completely known manner on the binary source signal $a_k$. This dependence can be described, for example, with the aid of a trellis diagram that specifies all possibilities for the evolution of $c_l$ as a function of the state variables of the modulation code and successive digits of the binary source signal $a_k$. The construction of such trellis diagrams is generally known and is described, for example, in an article 'The Viterbi Algorithm by G. D. Forney, Jr., Proc. IEEE, Vol. 61, pp. 268–278, March 1973. Detection of the binary source signal $a_k$ can thus be interpreted as the estimation of a path through the trellis diagram on the basis of the corrupted version $z_l$ of $c_l$. Efficient solutions to this estimation problem are generally known and normally involve the use of dynamic programming techniques, as described, for example, in said paper by Forney. Since it is in principle straightforward to construct a detector DET on the basis of these and similar techniques, this possibility will not be elaborated here in any further detail. It should be added that such a detector DET inevitably introduces a strictly positive decoding delay K and thereby has memory, in accordance with the requirement of the invention, and in contradistinction to the detector without memory in the receiver of FIG. 2 for the MFM modulation code.

For the sake of completeness, it is necessary to mention that certain modulation codes cannot be assigned unique values of P and N. This is the case, for example, for the FM modulation code, which is described in the aforementioned article by Siegel as having P=2 and N=1. In this code, every second binary encoded digit $b_{2k+1}$ is just the inverse of its immediate predecessor $b_{2k}$. When this linear relationship between $b_{2k}$ and $b_{2k+1}$ is regarded as a part of the operation of channel CHN, the FM code can also be described as having P=1 and N=1, so that even receivers of prior art exist that operate entirely at the symbol rate 1/T, as briefly discussed in said article by Siegel. For the latter description N/P amounts to 1 and hence does not satisfy the requirement $N/P < =^2\log(3)/2 = 0.79248$ of the invention. Thus, the invention does not cover binary modulation codes like FM when described by parameters N and P such that $N/P > ^2\log(3)/2$.

In practice it may happen that the impulse response $g_n$ of expression (4) closely resembles a sampled version of the impulse response of channel CHN in FIG. 1, and that noise is not a serious problem. In such a case, the equalizer EQ in the systems of FIGS. 3 and 9 becomes essentially unnecessary, and can of course be omitted in practice, in spite of the fact that FIGS. 3 and 9 specify its functional presence.

It is finally necessary to mention a synchronization problem that occurs in any receiver for modulation codes with P>1. For receivers REC of prior art as shown in FIGS. 1 and 2, decoder DEC generally fails to make correct decisions when sampling in sampler SMP occurs at the erroneous phase, as described in some detail in said article by Siegel for e.g. the MFM modulation code. This same problem occurs in the receiver of FIGS. 3 and 9 according to the invention. Here, sampling phase errors of magnitude NT/P cause the equalizer EQ to produce an estimate of signal $d_l$ according to expression (7) rather than $c_l$ of expression (6). Furthermore, since decoding occurs block-wise for blocks of P partial-response digits $c_l$ (or P/2 digits for even P), even if sampler SMP operates at the correct sampling phase there are still P-1 possibilities for erroneous word synchronization (or P/2-1 for even P). These two problems (of which the latter becomes nonexistent for the important practical case P=2) necessitate a synchronization mechanism. To acquire sampling phase synchronization, it is possible to detect partial-response patterns which can occur in only one of the two possible sampling phases. Such characteristic patterns exist for all modulation codes that were mentioned above, but are not presented here for the sake of brevity. Especially for small values of P, characteristic patterns tend to be short and to occur frequently. Detection of their presence is thereby comparatively simple, and enables one to rapidly ascertain that the correct or erroneous sampling phase is being used. For large P, on the other hand, characteristic patterns tend to be rather long and to occur much less frequently. This makes synchronization on the basis of characteristic patterns comparatively complicated and slow.

A possibly more attractive method of synchronization involves the transmission of a suitable preamble before the start of the actual data transmission. For the (2,7) modulation code mentioned earlier, for example, reception at the erroneous sampling phase of the all-zero signal $a_k$ results in a decoded signal of the form .. . 010101010 ... for all applicable partial-responses. Similarly, the all-one signal $a_k$ leads to the pattern ... 01000100010 ... , which is also easily distinguished from the actual data. Preambles in the form of encoded all-zero or all-one patterns thus enable rapid and simple synchronization. The same technique can be used for the MFM and Miller-Squared codes mentioned earlier. Here, the encoded versions of the all-zero and all-one signals $a_k$ are identical up to a phase difference by $T/2$. Thus, an erroneous sampling phase transforms a preamble of encoded zeros into the all-one signal upon decoding and vice versa irrespective of th applied partial-response polynomial $g(D)$. This property can be used for synchronization within a few symbol intervals, and at a modest hardware cost. For the 3PM code mentioned earlier, the encoded version of a periodic data pattern $a_k$ with period 3 (i.e. the wordlength N of 3PM) may be used as a preamble. When reception occurs at the correct sampling phase, the periodicity makes it easy to identify the beginning of each word. At the erronous phase, a decoded data pattern clearly distinct from the encoded one should emerge. Patterns which satisfy this prerequisite exist for all partial-response polynomials $g(D)$ and sampling phases of interest, but are not presented here for the sake of brevity.

What is claimed is:

1. System for transmitting a binary source signal from a data transmitter to a data receiver through a noisy dispersive channel, the data transmitter comprising a sliding block encoder for converting the binary source signal at a given symbol rate $1/T$ into an encoded binary data signal at a symbol rate $P/(NT)$, where P and N are positive integers such that $N/P \leq 2\log(3)/2 = 0.79258$, said channel introducing into the encoded data signal intersymbol interference and noise, and the data receiver comprising the cascade of an equalizer and a sampler for producing samples at the output of the sampler at a sampling rate $P/(2NT)$, and a reconstruction circuit for producing from said samples a reconstructed binary source signal at the symbol rate $1/T$, wherein the reconstruction circuit comprises a detector for producing a ternary data signal at the symbol rate $P(2NT)$ in response to said samples, and a decoder with memory for deriving the reconstructed binary source signal in a manner that each symbol of said reconstructed binary signal is derived as a function of at least two successive symbols of said ternary data signal.

2. System according to claim 1, wherein the decoder with memory comprises a shift register that is clocked at the sampling rate $P/(2NT)$, a buffer responsive to a given number of M successive stages of said shift register for storing the outputs of said M successive stages during successive intervals of length 2NT, a table addressed by the contents of said buffer whose entries are estimates of 2N successive symbols of the binary data signal, and selection means to form said reconstructed binary source signal from successively addressed table entries.

3. System according to claim 1 for which the integer P assumes an even value, wherein the decoder with memory comprises a shift register that is clocked at the sampling rate $P/(2NT)$, a buffer responsive to a given number of M successive stages of said shift register for storing the outputs of said M successive stages during successive intervals of length NT, a table addressed by the contents of said buffer whose entries are estimates of N successive symbols of the binary data signal, and selection means to form said reconstructed binary source signal from successively addressed table entries.

4. System for transmitting a binary source signal from a data transmitter to a data receiver through a noisy dispersive channel, the data transmitter comprising a sliding block encoder for converting the binary source signal at a given symbol rate $1/T$ into an encoded binary data signal at a symbol rate $P/(NT)$, where P and N are positive integers such that $N/P \leq 2\log(3)/2 = 0.79258$, said channel introducing into the encoded data signal intersymbol interference and noise, and the data receiver comprising the cascade of an equalizer and a sampler for producing essentially ternary samples at the output of the sampler at a sampling rate $P/(2NT)$, and a reconstruction circuit for producing from said samples a reconstructed binary source signal at the symbol rate $1/T$, where the reconstruction circuit comprises a detector with memory for deriving in response to said samples the reconstructed binary source signal in a manner that each symbol of said reconstructed binary signal is derived as a function of at least two successive samples.

* * * * *